United States Patent
Casbolt et al.

(10) Patent No.: US 8,002,298 B2
(45) Date of Patent: Aug. 23, 2011

(54) VEHICLE HAVING AN ELEVATED CAB AND ACCESS STEPS

(75) Inventors: Peter Casbolt, South Benfleet (GB); Vince Ellis, Corringham (GB); Jim Callan, Grays (GB)

(73) Assignee: CNH America LLC, New Holland, PA (US)

( * ) Notice: Subject to any disclaimer, the term of this patent is extended or adjusted under 35 U.S.C. 154(b) by 310 days.

(21) Appl. No.: 12/167,518

(22) Filed: Jul. 3, 2008

(65) Prior Publication Data

US 2009/0008895 A1    Jan. 8, 2009

(30) Foreign Application Priority Data

Jul. 4, 2007  (GB) .................................. 0712917.4

(51) Int. Cl.
*B60R 3/02* (2006.01)
(52) U.S. Cl. .................. 280/166; 280/163; 280/169
(58) Field of Classification Search .................. 280/163, 280/166, 169, 760, 763.1; 296/190.08, 190.01, 296/62
See application file for complete search history.

(56) References Cited

U.S. PATENT DOCUMENTS

| | | | | |
|---|---|---|---|---|
| 1,891,998 A * | 12/1932 | Nafziger | ...................... | 180/273 |
| 1,915,327 A | 6/1933 | McWhirter | | |
| 3,997,183 A * | 12/1976 | Russey | .......................... | 280/166 |
| 4,071,260 A * | 1/1978 | Marshall, Sr. | ................ | 280/166 |
| 4,200,303 A | 4/1980 | Kelly | | |
| 4,240,521 A * | 12/1980 | Naka | ............................... | 182/84 |
| 4,324,317 A * | 4/1982 | Winkelblech | ................. | 187/267 |
| 4,356,894 A * | 11/1982 | Everett | ......................... | 414/680 |
| 4,536,004 A * | 8/1985 | Brynielsson et al. | ......... | 280/166 |
| 5,092,617 A * | 3/1992 | Jones, Jr. | ...................... | 280/166 |
| 5,280,934 A | 1/1994 | Monte | | |
| 5,401,055 A * | 3/1995 | Pham | ........................... | 280/755 |
| 5,433,423 A * | 7/1995 | Whightsil, Sr. | ............ | 267/141.1 |
| 5,439,342 A * | 8/1995 | Hall et al. | ..................... | 414/545 |
| 5,584,493 A | 12/1996 | Demski et al. | | |
| 6,027,131 A * | 2/2000 | Wijlhuizen | .................. | 280/166 |
| 6,178,364 B1 | 1/2001 | Delurey | | |
| 6,264,222 B1 * | 7/2001 | Johnston et al. | ............. | 280/166 |
| 2003/0168421 A1 * | 9/2003 | Davis | ............................ | 212/302 |
| 2005/0035568 A1 * | 2/2005 | Lee et al. | ..................... | 280/166 |

FOREIGN PATENT DOCUMENTS

| | | |
|---|---|---|
| DE | 102005040908 | 3/2007 |
| FR | 2551490 | 9/1983 |
| GB | 2045699 A | 11/1980 |
| JP | 2000168453 | 6/2000 |

* cited by examiner

*Primary Examiner* — J. Allen Shriver, II
*Assistant Examiner* — Bryan A Evans
(74) *Attorney, Agent, or Firm* — Patrick M. Sheldrake; Michael G. Harms

(57) ABSTRACT

A vehicle with an elevated cab is provided with a power driven access step that is capable of being moved between an operating lower position and a raised stowage position. The step is carried by at least one telescopically collapsible tubular strut and an actuator is housed within the strut for raising and lowering the step by extending and contracting the strut.

15 Claims, 2 Drawing Sheets

VEHICLE HAVING AN ELEVATED CAB AND ACCESS STEPS

FIELD OF THE INVENTION

The present invention relates to access steps for the cab of an agricultural vehicle.

BACKGROUND OF THE INVENTION

Because of the height above the ground of the cab of certain agricultural vehicles, such as tractors, combine harvesters or forage harvesters, it is often necessary to provide steps leading up to the cab door. If the steps reach down to ground level, they can be negotiated easily and safely. There is however a risk of the lowermost step snagging the ground when the vehicle is driven over uneven terrain. If the lowest step is made sufficiently high to avoid such a risk, then it becomes difficult for the driver to climb onto the first step.

It has previously been proposed to provide vehicles having elevated cabs with access steps that can be moved to different positions. For example, JP 2000168453 describes a ladder that can be raised manually by pivoting it about a horizontal axis, wherein the ladder is made up of two telescopically collapsible sections.

Another ladder is described in FR 2551490. The ladder is made of two sections of which the first is pivotably secured to the vehicle and the section is slidable up and down relative to the first. An actuator that cannot be operated when the vehicle is capable of moving is used to extend and contract the ladder.

U.S. Pat. No. 1,915,327 describes a power driven step for a public service vehicle than can be raised and lowered by sliding or folding. The latter patent is concerned with the safety of such a step and provides a control to prevent the vehicle from being operated while someone is standing on the step or an object, such as clothing, is caught up in the step.

U.S. Pat. No. 6,178,364 describes steps that are used on a truck intended for use on metalled road surfaces. In this case, snagging the ground is not a problem but having laterally projecting steps is unacceptable in view of the increased vehicle width. This patent teaches a set of steps that can swivel about a vertical axis to allow them to be stacked behind the front wheel of the lorry.

In vehicles with manually operated access steps, there is a risk of the step being left in its extended position while the vehicle is moving which can result in damage to the step and in a mud build up on the step. With powered steps, there is a risk that the actuator and the mechanical linkages used to raise and lower the step can be damaged by contact with the ground or an accumulation of debris.

SUMMARY OF THE INVENTION

According to the present invention, there is provided a vehicle having an elevated cab and a power driven access step that is capable of being moved between an operating lower position and a raised stowage position, wherein the step is carried by at least one telescopically collapsible tubular strut and an actuator is housed within the strut for raising and lowering the step by extending and contracting the strut.

By housing the actuator powering the movement of the step within the telescopic strut on which it is supported, the invention protects the actuator and its linkages to ensure that it is always capable of raising and lowering the step when it is needed. The step may thus be lowered automatically to assist entry into and exit from the cab and it can be raised automatically when the vehicle is moving.

The actuator could be an electric motor but it is preferred to use a fluid operated actuator and more preferably still a pneumatic actuator.

The actuator may be a single acting cylinder, being spring biased in one direction and fluid operated in the other, but it is preferred to use as an actuator a double acting pneumatic cylinder.

It is desirable for the control system of the actuator to ensure that the step is always down when the operator wishes to enter into or exit from the cab and always raised when the vehicle is moving. A variety of criteria may be adopted to determine when the step should be raised and lowered.

One could, for example, rely simply on whether or not the ignition key of the vehicle has been inserted or the ignition has been turned on. In this case, the step would be lowered while the ignition is off and raised again as soon as the ignition has been turned on. Such a solution is not entirely satisfactory as the operator may sometimes wish to step down from the cab for a few moments while leaving the engine running.

Relying on a signal from a sensor associated with a gear selector is also not entirely satisfactory as it can result in the step being lowered if the vehicle coasts in neutral.

An alternative could be to rely on a seat switch sensing when the operator is seated in the cab, but this too is not an ideal solution as the operator may wish to admit a passenger while occupying his own seat.

A door position sensing switch is a further alternative, but that requires the operator to be able to open the door while standing on the ground, which is not always possible.

The preferred approach is to provide a control system sensitive to the speed of the vehicle to raise the step automatically when the vehicle speed exceeds a preset threshold and lower it again when the vehicle is at or near standstill.

Because the step is power operated, it is important to take precautions to ensure that no injury is caused to a person standing on the step, nor any object lying in the path of the step, as it is being raised. It is possible in this respect to include a spring in the linkage connecting the actuator to the step so as to limit the force acting to raise the step. A similar limitation of the raising force can be achieved by placing a relief valve to limit the pressure in the working chamber acting to raise the step, or, in the case where a motor is used as an actuator, limiting the output torque of the motor.

A still further possibility is to provide a sensor to detect when the step meets an obstacle or has weight resting on it and to override the automated operation of the actuator immediately if such an obstacle is sensed to be present.

The step may in this case be formed of a lower plate rigidly secured to the telescopic strut and the sensor may comprise a pressure plate overlying the lower plate and movable relative to the lower plate against the action of a spring on encountering an obstacle. Alternatively, the step may be pivotably connected to the strut and urged upwards by a spring, a sensor being provided to detect downwards pivoting of the step relative to the strut.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
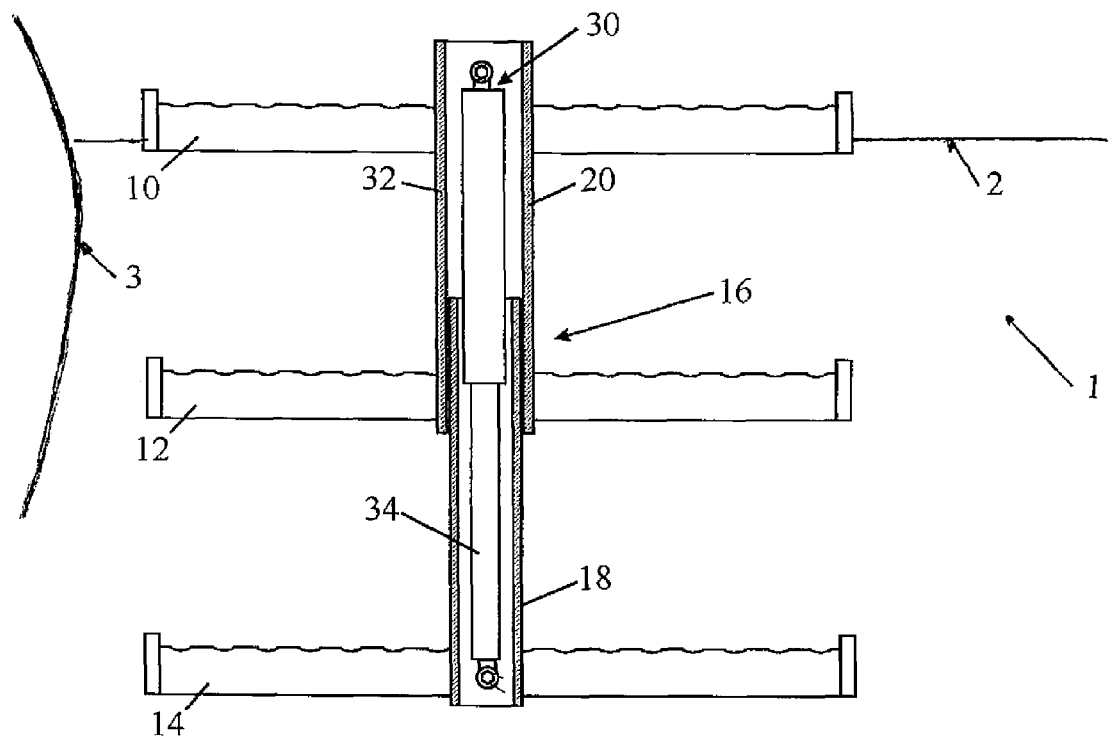
FIG. 1 is a sectional through a strut supporting two fixed steps and one retractable step, the strut being viewed from the front of the steps and the side of the vehicle, with the retractable step in its lowered position.
Figure 2:
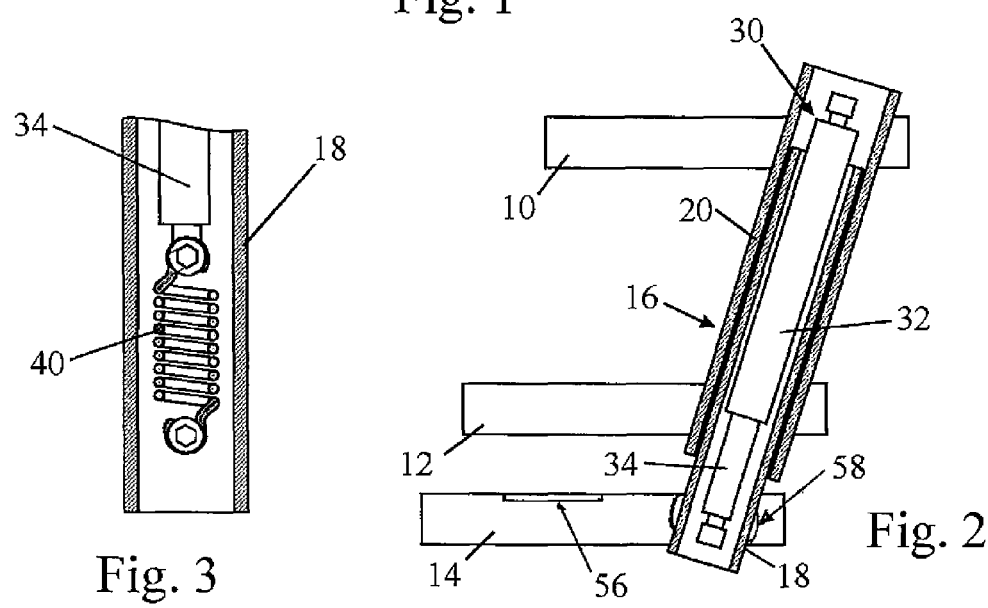
FIG. 2 is a sectional view through the strut of FIG. 1 with the strut viewed along the length of the vehicle with the retractable step in its raised position.
Figure 4:
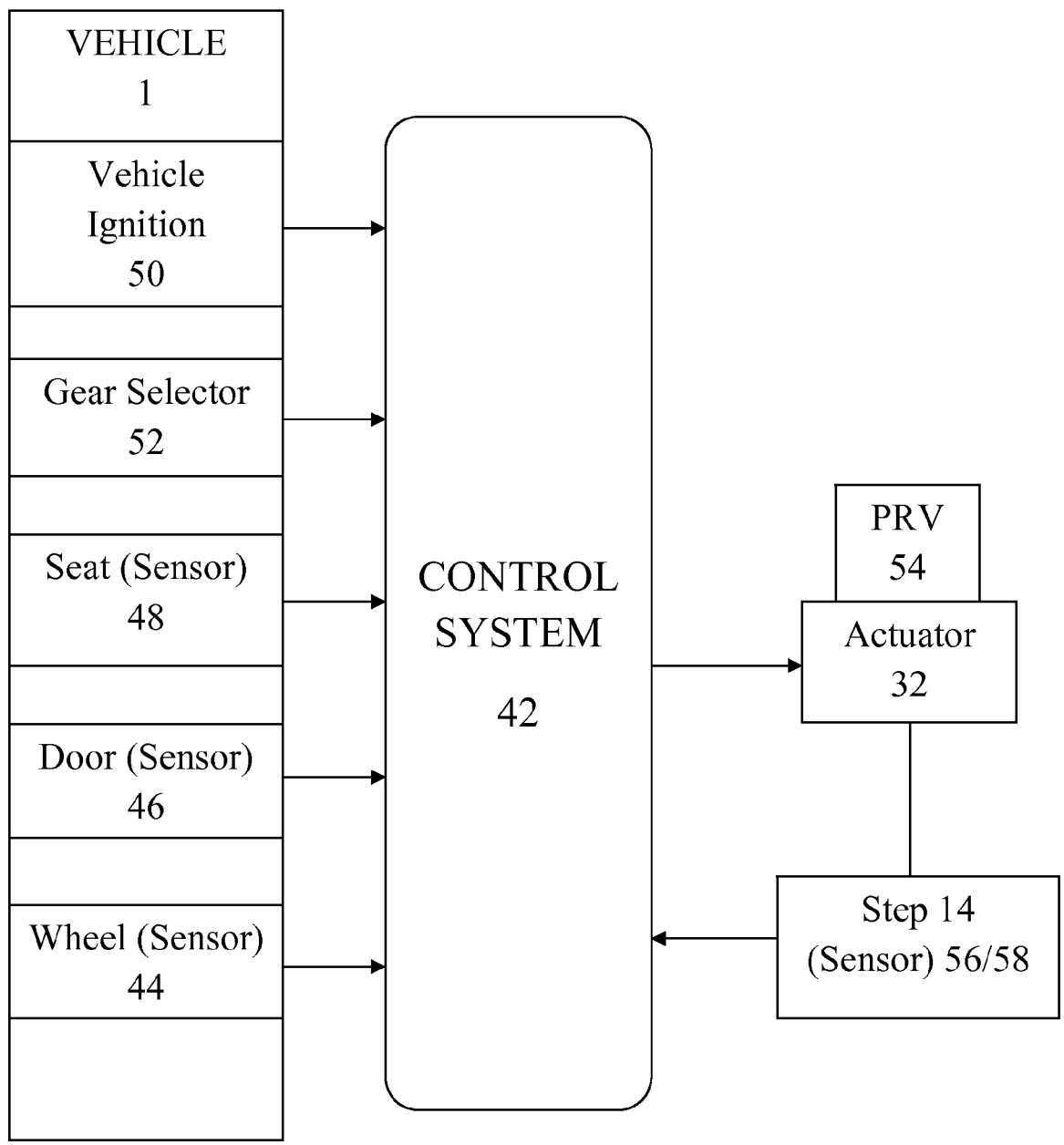
FIG. 4 shows a schematic view of the control system of the vehicle.

FIGS. 1 and 2 show three steps 10, 12 and 14 that are mounted on the side a vehicle 1, such as a tractor or a combine harvester, having an elevated cab 2, the steps enabling the driver to climb safely into the cab. The steps 10, 12 and 14 are mounted on a strut, generally designated 16, which is made up of two sections 18 and 20. The lower section 18 is telescopically collapsible into the upper section 20, which has the larger cross section. Two of the steps 10 and 12 are mounted on the upper section 20 while the lowest step 14 is mounted on the movable section 18 of the strut 16. With the strut 16 extended, as is shown in FIG. 1, the lowest step 14 lies close to the ground so that the driver may easily and safely mount onto it. When the strut 16 is retracted, the step 14 is moved to its stowed position shown in FIG. 2 where it is raised further from the ground to avoid it colliding with the ground or accumulating debris when the vehicle is on uneven terrain.

FIG. 2 also shows that the strut 16 is inclined to the vertical (the steps 10, 12 and 14 being horizontal) so that the step 14 also moves away from the side of the vehicle to resemble a staircase rather than a ladder, which makes climbing into the cab and, even more so, descending from the cab easier and safer.

The mechanism used to extend and retract the strut 16 is a pneumatic actuator, generally designated 30, housed within the tubular strut 16. The actuator 30 comprises a cylinder 32 that is secured to the upper section 20 of the strut and is connected to compressed air or vacuum lines (not shown). The manner in which the cylinder 32 is secured to the strut section 20 is not shown in detail in the drawings and may simply comprise a bolt passing through a bush affixed on the cylinder. The piston rod 34 of the actuator is connected in a similar manner to the lower section 18 of the strut 16.

The cylinder 32 preferably houses a double acting piston so that the strut 16 is pneumatically powered both as it is being extended and contracted. It is however alternatively possible to use a spring to move the step 14 in one direction and pneumatic power in the opposite direction.

Usually, the steps and the actuating mechanism are located immediately to the rear of the front wheel 3 of the vehicle and are constantly exposed to mud thrown up by the wheel. It can be seen that the invention provides a step 14 that can be raised and lowered in a linear motion using an actuating mechanism that is entirely concealed and protected from this hostile environment.

The operation of the pneumatic actuator 30 may simply be effected by control switches operated by the driver and located in a position accessible from outside and inside the cab. It is preferable however for the raising and lowering of the step 14 to be initiated automatically by a control system 42 that receives a signal from a wheel speed sensor 44. In this way, the step 14 can be raised as soon as it is sensed that the vehicle speed has risen above a preset first threshold (which may be zero or near zero) and it can be lowered again when the speed drops below a second threshold, which may be the same as or different from the first threshold. To avoid instability, it is desirable to provide some degree of hysterysis by setting the second threshold vehicle speed lower than the first.

As earlier mentioned, alternative criteria may be used for raising and lowering the step 14 automatically, such as the opening of the door 46 of the cab, the occupancy of the driver's seat 48, operation of the vehicle ignition 50 and/or engagement of a driving gear 52.

Figure 3:
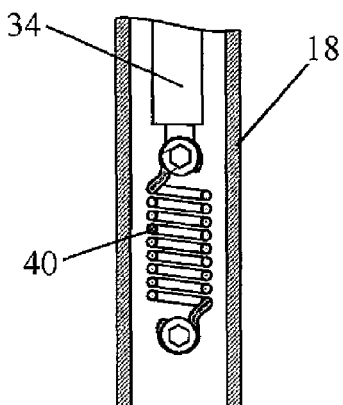
FIG. 3 shows a detailed view of a strut with a modification to limit the force applied to raise the retractable step to its stowed position.

Because of the considerable force that can be applied by the actuator to raise the step, it is important to provide a safeguard against injury if a person is standing on the step as it is being raised. A simple manner in which this can be achieved is shown in FIG. 3 which shows a modification of the manner in which the piston rod 34 of the actuator is connected to the lower section 18 of the strut. Instead of the piston rod being coupled directly to the section 18 a spring 40 is interposed between the two. If the step 14 is obstructed as it is being raised, the force applied to the obstruction is limited by expansion of the spring 40.

A similar limitation of the raising force can be achieved by using a relief valve 54 to limit the pressure in the actuator. If an electric motor is used as the actuator, one can limit the current to the motor and hence its output torque.

It is also desirable when an automatic control system is used to raise and lower the step to provide an override for safety reasons.

One may provide for convenience a manually operated switch to override the control system. This may be used to prevent the step from being raised or lowered or to raise or lower the step intentionally. Such a switch may for example be used as an emergency switch if the step should encounter an obstacle or to prevent the step from being lowered if the vehicle is moving very slowly over very muddy ground. It can also be used to test that the actuator is functioning correctly.

A still further possibility is to override the control system automatically when raising the step 14 if a sensor 56 detects that the step has met an obstacle or that a weight is resting on the step.

The sensor 56 may in this case be built into the tread of the step 14. Alternatively, the step 14 may be pivotably mounted on the section 18 whereupon an obstruction would be sensed by a microswitch or a strain gauge 58 built into the coupling. Of course, these are just two ways of sensing that the step 14 has collided with an obstruction and are not intended as an exhaustive list of the possibilities for detection such imminent danger.

It will be appreciated that though the steps in the preferred embodiment are carried by a single strut, it would be possible for them to be mounted on two or more such struts. In this case, a single actuator in one of the telescopic struts should still suffice to raise and lower the step.

We claim:

1. A vehicle comprising:
   an elevated cab;
   a power driven access step for moving a step between an operating lower position and a raised stowage position;
   the step connected to at least one telescopically collapsible tubular strut, having at least first and second portions, wherein the first portion is collapsible into an interior section of the second portion; and
   an actuator housed within the interior section of the second portion of the strut and connected to the first portion for raising and lowering the step by extending and contracting the strut; and
   an element for limiting the force applied by the actuator when raising the step to the stowed position wherein the element for limiting force is a spring mounted between and connecting the actuator and one portion of the strut such that a force applied by the actuator to the step through the strut in a closing direction is limited by expansion of the spring.

2. A vehicle as claimed in claim 1, wherein the actuator is a fluid operated cylinder.

3. A vehicle as claimed in claim 2, wherein the actuator is a pneumatic actuator.

4. A vehicle as claimed in claim 2, wherein the actuator is double acting.

5. A vehicle as claimed in claim 1, further comprising a control system configured to automatically operate the actuator upon receiving a signal of a vehicle condition.

6. A vehicle as claimed in claim 5, wherein the vehicle condition is a speed of the vehicle.

7. A vehicle as claimed in claim 5, wherein the vehicle condition is the presence or absence of an ignition key or that a vehicle ignition has been turned on or off.

8. A vehicle as claimed in claim 5, wherein the vehicle condition is the position of a gear selector.

9. A vehicle as claimed in claim 5, wherein the vehicle condition is a signal from a seat switch sensing when the operator is seated in the cab.

10. A vehicle as claimed in claim 5, wherein the vehicle condition is the position of a door of the cab.

11. A vehicle as claimed in claim 5, further comprising a sensor mounted in a tread of the step to detect when the step has weight resting on it, wherein the control system is configured for preventing the actuator to raise the step immediately if a weight is sensed to be present.

12. A vehicle as claimed in claim 1, wherein a step is mounted to each of the first and second portions of the strut.

13. A vehicle as claimed in claim 2, wherein the strut is mounted to the vehicle directly rearward of a wheel of the vehicle with respect to the direction of travel and a portion of an extendible shaft of the cylinder protruding from the cylinder is enclosed by the collapsible strut.

14. A vehicle as claimed in claim 5, further comprising a sensor located within a pivotal connector mounting the step to the strut to detect when the step meets an obstacle or has weight resting on it, wherein the control system is configure for preventing the actuator to raise the step immediately if such an obstacle is sensed to be present.

15. A vehicle as claimed in claim 6, wherein the control system is configured to raise the step once the speed of the vehicle is above a preset first threshold speed and to lower the step once the speed drops below a second vehicle speed lower that the first vehicle speed.

* * * * *